UNITED STATES PATENT OFFICE 2,258,000

TREATMENT OF WELLS PRODUCING MINERAL FLUID

Leonard C. Chamberlain, Midland, Mich., assignor to The Dow Chemical Company, Midland, Mich., a corporation of Michigan No Drawing. Application March 15, 1937, Serial No. 131,019

5 Claims. (Cl. 166—21)

The invention relates to the treatment of oil or gas wells penetrating a formation yielding water or brine. It more particularly concerns an improved method of preventing water or brine inflow to such wells without adversely affecting the flow of oil or gas.

An examination of cores taken from the producing formations of wells yielding oil as well as water or brine shows that there is almost invariably present in the pores or interstices of the oil producing portions of the formation a certain amount of water which is not displaced by the passage of oil therethrough. This water appears to be held in the interstices by capillary attraction and is generally referred to as connate water. I have found that, when it is attempted to effect a differential shutting off of water or brine inflow without affecting the flow of oil by injecting into the formation a treating solution of the type forming a clogging precipitate in contact with water but not with oil, more or less plugging actually occurs in the oil producing portions of the formation because of the presence therein of such connate water. This water, which is not displaced as the oil normally flows to the well, reacts with the treating solution of the type aforementioned to produce deposits in the oil producing portions of the formation, restricting the flow of oil. Although such deposition is in general not as bulky as that produced in the passages which are flooded mainly with water and through which water or brine flows to the well, nevertheless I have found that it is sufficient in amount in many cases to produce a substantial reduction in the rate of flow of oil to the well.

A considerable number of solutions are now available for shutting off water in oil wells, which solutions form insoluble precipitates or deposits of one kind or another when brought into contact with the water (or brine) in the water-bearing portions of the formation. In general these solutions may be classified in two groups.

In one group the solutions are of a type forming, with water, deposits which are insoluble in both oil and water. Examples of these are aqueous solutions of inorganic salts which react with the constituents of the well waters to form water-insoluble precipitates, e. g. aqueous solutions of soluble silicates, soluble carbonates, soluble hydroxides, soluble soaps formed from an alkali metal base and a fatty acid, etc., and certain sols or colloidal solutions such as ferric hydroxide sol, which is coagulated by brine. Solutions of water- and oil-insoluble substances in non-aqueous solvents which are wholly or partly soluble in water are also in this class. Specific examples of these are cellulose acetate dissolved in acetone, nitrocellulose dissolved in a mixture of alcohol and ether. Such solutions yield in general plugging precipitates when diluted with water or brine. Solutions in oil of certain metal halides hydrolyzable to produce water- and oil-insoluble deposits, e. g. titanium tetra chloride and silicon tetra chloride, are further illustrations of the oil- and water-insoluble type of plugging agent. Such precipitates being insoluble in oil cannot be washed out of the oil producing portions of the formation when the well is put into production.

In the other group solutions are employed which form precipitates that are insoluble in water, but soluble in oil. These are the solutions of an oil-soluble but water-insoluble solid or semi-solid substance in a solvent freely or partially miscible with water. Alcoholic solutions of paraffin wax, naphthalene dissolved in alcohol, stearic acid dissolved in isoamyl alcohol, are illustrative of this type of solution. The precipitation of the water-insoluble but oil-soluble deposit is brought about when the well waters become mixed with the solution. Although such precipitates are oil-soluble and therefore can be washed out of the oil producing portions of the formation, should deposition be brought about there by the connate water, such washing out takes a relatively long time during which considerable losses in production occur.

I have now found that by injecting into the formation a non-acid liquid capable of absorbing water to form a non-acid solution substantially free from soil suspended matter and of substantially lower surface tension than that of water and then putting the well into production for a short time, it purges itself of the liquid which carries with it the absorbed connate water. Thereupon, by injecting into the formation an agent of the type forming in contact with water or brine, but not with oil, a plugging deposit insoluble in water, the water bearing portions of the formation can be substantially sealed off without material risk of forming solid or semi-solid deposits in the oil bearing portions of the formation. The invention, then consists of the method hereinafter fully described and particularly pointed out in the claims.

In the treatment contemplated by my process I inject into the oil producing stratum a liquid of non-acid character which is capable of absorbing water and producing therewith a non-acid aqueous solution substantially free from solid suspended matter and having a substantially lower surface tension than that of water itself. Examples of suitable liquids for the purpose are: the water-soluble alcohols such as methyl, ethyl, propyl, butyl, and isopropyl alcohol; water-soluble ketones such as methyl ethyl ketone, acetone; the water-soluble phenols, cresols, xylenols, and the like; and aqueous solutions thereof, which in absorbing water form aqueous solutions of non-acid character exhibiting a substantially lower surface tension than that of water itself. The amount of such liquid to be employed largely depends upon the degree of permeability of the formation and the extent to which it is to be treated. For example I have found that from about 50 to 1500 gallons or more may be employed with beneficial results. After the liquid is injected the next step, which is carried consecutively, is to permit the formation to purge itself of the liquid, together with its absorbed water, by putting the well into production.

After the well has been thus purged of the liquid, a water shut-off solution of the type capable of forming a water-insoluble deposit in contact with water or brine, but not with oil, is injected into the formation. In accordance with my invention I employ any of the known liquids (or solutions) which when brought into contact with the water (or brine) produce a water-insoluble deposit, examples of which are given above.

The following example is illustrative of a mode of carrying out the invention in a well provided with the usual casing and tubing. The well is shut down, and a packer is placed around the tubing preferably at the top of the producing formation, sealing the annular space between the tubing and the well bore. A non-acid liquid capable of forming with water a solution substantially free from solid suspended matter and of substantially lower surface tension than that of water is introduced into the well through the tubing and thence into the formation, pressure being applied to the liquid, if necessary, by forcing in an additional quantity thereof or by following it with a load of oil so as to inject the liquid into the formation.

After the liquid is injected into the formation, the well is put back into production by bailing, pumping, or allowing the well to flow, whereby the surrounding formation purges itself of the liquid which carries with it the connate water. Then a solution capable of forming a plugging deposit when brought into contact with water or brine is introduced into the well and thence into the formation under pressure. The pressure is maintained for a time to allow intermingling of the solution and the water in the formation. The pressure is then released and the well put into production.

The foregoing method has the advantage that water or brine infiltration in an oil or gas well may be substantially reduced or prevented without material risk of reducing the flow of oil or gas when the portions of the formation producing these fluids contain water or brine, which is not displaced during production but which brings about the deposition of plugging deposits hindering the oil or gas flow. The method also has the advantage of increasing the flow of oil or gas, which results from the removal of connate water from the oil and gas bearing pores brought about by the first two steps of the process as described and claimed in my copending application Serial No. 131,018, filed March 15, 1937.

Other modes of applying the principle of my invention may be employed instead of the one explained, change being made as regards the method herein disclosed, provided the step or steps stated by any of the following claims or the equivalent of such stated step or steps be employed.

I therefore particularly point out and distinctly claim as my invention:

1. In a method of treating a well penetrating a formation yielding both oil and water (or brine) to effect a reduction of water or brine inflow without adversely affecting the flow of oil to the well, the steps carried out consecutively which consist, first, in introducing alone into the well and thence into the formation a water-soluble surface tension lowering non-acid liquid agent and, second, putting the well into production until it is substantially purged of the liquid agent and, third, introducing into the well and thence into the formation a solution forming with water an insoluble deposit capable of stopping the water- or brine-producing pores of the formation.

2. The method defined in claim 1, in which the water-soluble surface tension lowering non-acid liquid agent employed is a water-soluble alcohol.

3. The method defined in claim 1, in which the water-soluble surface tension lowering non-acid liquid agent employed is a water-soluble ketone.

4. The method defined in claim 1, in which the water-soluble surface tension lowering non-acid liquid agent employed is selected from the group consisting of a water-soluble phenol, cresol, and xylenol.

5. In the process of selectively sealing off a formation traversed by a well, said formation comprising water-bearing layers adjacent oil-bearing layers holding relatively small quantities of connate water, the steps of introducing into the well and forcing into the formation an inert non-aqueous solvent miscible with water and oil, allowing said solvent to dissolve the formation waters, withdrawing the solvent and the waters dissolved therein from the formation and the well, whereby the water removed with the solvent is caused to be replaced with water in the water-bearing layers and with oil in the oil-bearing layers, and introducing into the well and forcing into the formation a sealing agent forming oil and water insoluble compounds by hydrolysis, whereby a sealing precipitate is caused to form within the water-bearing layer.

LEONARD C. CHAMBERLAIN.